June 24, 1958 E. G. STEVENS 2,839,787
APPARATUS FOR MOLDING POWDERED GRANULAR
MATERIAL INTO PREFORMED ARTICLES
Filed July 19, 1954

INVENTOR:
E. G. STEVENS
BY C. B. Hamilton
ATTORNEY

United States Patent Office 2,839,787
Patented June 24, 1958

2,839,787

APPARATUS FOR MOLDING POWDERED GRANULAR MATERIAL INTO PREFORMED ARTICLES

Everett G. Stevens, St. Louis, Mo., assignor to Western Electric Company, Incorporated, New York, N. Y., a corporation of New York Application July 19, 1954, Serial No. 444,007

3 Claims. (Cl. 18—30)

This invention relates to apparatus for molding powdered granular material into preformed articles, and more particularly to apparatus for preforming porcelain protector blocks.

In the manufacture of ceramic articles such as, for example, porcelain protector blocks used in the communication industry, the blocks are formed and pressed together into preforms, after which they are fired to complete the article. In the preforming of the articles, the frit or porcelain mixture often is fed to a shuttle from a hopper which moves back and forth over a mold opening to fill the mold opening each time the shuttle is fed thereto. In such apparatus, the shuttle is connected to a hopper or the like, and either the hopper must be moved with the shuttle, which is a cumbersome construction, or some arrangement must be made to connect the shuttle to the hopper to permit the latter to move relative to the hopper. Flexible hoses have been used in the past to connect these elements but the powdered or granular material has packed in the hoses so that the feed therethrough has not been good.

An object of the invention is to provide new and improved apparatus for molding powdered or granular material.

Another object of the invention is to provide apparatus for molding protector blocks.

Another object of the invention is to provide apparatus for feeding granular material to a mold with a minimum of movement of the parts and preventing packing of granular material in the transferring apparatus.

An apparatus illustrating certain features of the invention may include a hopper and a shuttle movable relative to the hopper between a retracted position located away from a die and a loading position positioned over a die. An elastic hose serves to connect the shuttle to the hopper and is of such a length that the hose is compressed when in its retracted position, and is stretched when in its loaded position so that granular material fed therethrough from the hopper is prevented from packing.

Figure 1:
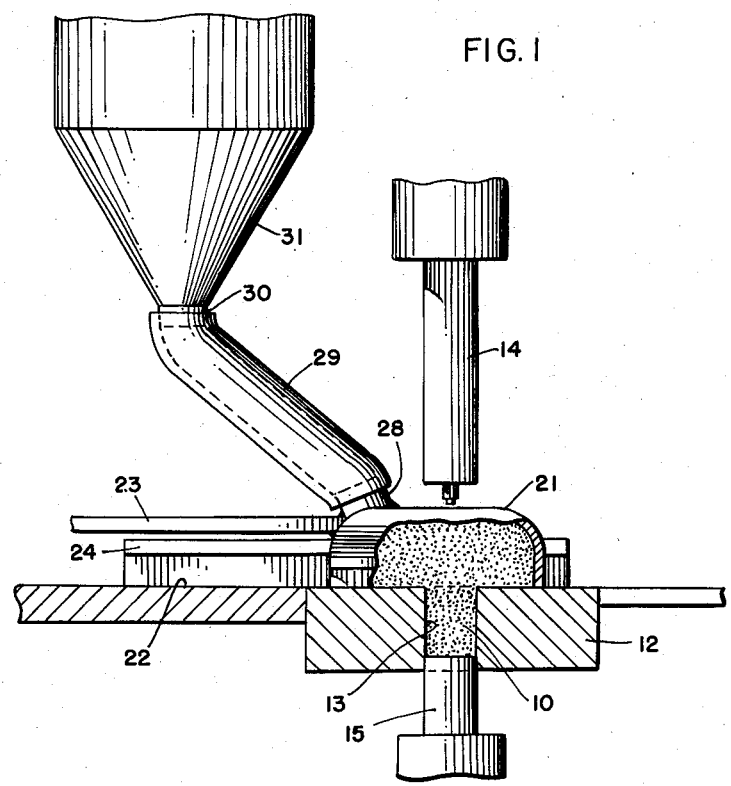
Figure 2:
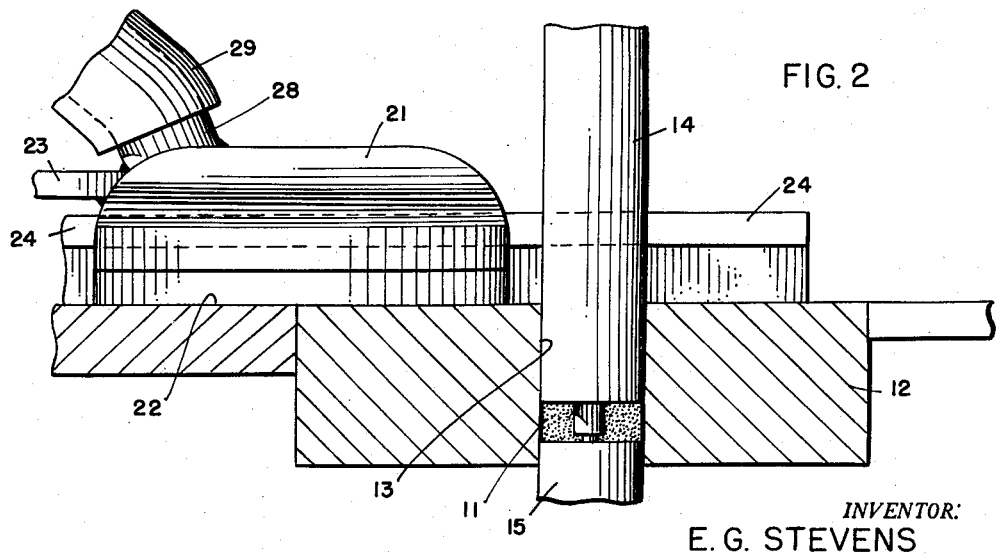

A complete understanding of the invention may be obtained from the following detailed description of an apparatus forming a specific embodiment thereof, when read in conjunction with the appended drawings, in which Fig. 1 is a fragmentary, partially, sectional front elevation of an apparatus forming one embodiment of the invention, and Fig. 2 is a view similar to Fig. 1 with elements of the apparatus shown in different positions from those they occupy in Fig. 1.

Referring now in detail to the drawings, there is shown therein an apparatus for molding granular frit 10 into a protector block preform 11. This apparatus includes a mold 12 having a cylindrical cavity 13 therethrough into which forming tools 14 and 15 of a well known type may be moved to form the powder 10 in the cavity into the preform 11, after which the tools 14 and 15 are moved downwardly to move the preform 11 out of the cavity 13. Then the tool 14 is lifted upwardly to the position in which it is shown in Fig. 1, the preform then is removed from the tool 15, either manually or by some well known type of ejecting means, and the tool 15 then is moved back into the position in which it is shown in Fig. 1, closing the bottom of the cavity 13.

A shuttle 21 opening onto and slidable on a surface 22 flush with the top of the cavity 13 is reciprocated by a link 23 and is moved along guide rails 24 from a retracted position as shown in Fig. 2 to a feeding position as shown in Fig. 1. When the shuttle moves over the cavity 13, powdered material filling the interior of the shuttle drops into the cavity 13 and fills the cavity, after which the link 23 moves the shuttle back to its retracted position and the next preform is molded with a predetermined amount of granular material in the cavity 13.

The shuttle 21 is provided with an inlet 28 to which is secured an elastic, stretchable hose 29, which is connected at the end to an outlet 30 of a hopper 31 holding the granular molding material 10 therein. The hose 29 is of such a length that, when the shuttle 21 is moved to its feeding position, the hose is stretched, and when the shuttle 21 is moved back to its retracted position the hose 29 is compressed slightly. The alternating stretching and compressing of the hose 29 flows the granular material freely and prevents packing of the material in the hose and the hopper so that the material flows freely through the hose and through the shuttle to the cavity 13 even though the hopper 31 and the die 12 may be vibrated by some suitable well known mechanism, if it is so desired. Also, the hose 29 is fastened tightly to the inlet 28 and the outlet 30 so that there is no possibility of leakage between the hopper 31 and the shuttle 21.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for molding granular material which comprises a mold having an upper horizontal surface running to a molding cavity formed therein, a shuttle mounted for movement along said horizontal surface into communication with said cavity, a hopper spaced above and offset from said cavity, a longitudinally stretchable elastic hose of a predetermined length interconnecting said hopper and said shuttle for restraining said shuttle from movement into communication with said cavity, and means for moving said shuttle against said restraining action of said hose to elongate said hose beyond said predetermined length and move said shuttle into communication with said cavity.

2. A molding apparatus which comprises a mold having a cavity formed therein, said mold having a flat upper surface surrounding said cavity, a shuttle positioned on and adapted to move over said surface into communication with said cavity, an inlet means mounted on said shuttle, a hopper spaced above and offset from said cavity, an outlet means mounted on said hopper to a predetermined distance from said cavity, a stretchable elastic hose secured at its ends to said inlet and outlet means for holding said shuttle from communication with said cavity, and means for moving said shuttle over said cavity against the action of the stretchable elastic hose.

3. In an apparatus for molding granular material in a cavity formed in a mold, a shuttle adapted to be moved over said cavity to deposit granular material therein, an inlet on said shuttle for said granular material, a hopper for holding a supply of granular material, an outlet on said hopper spaced above and offset with respect to said cavity in the mold, a stretchable elastic hose of predetermined length secured at its ends to said inlet and outlet for resiliently holding the shuttle from movement over the cavity, and means for moving said cavity against the holding action of said stretchable elastic hose into a position over said cavity.

References Cited in the file of this patent

UNITED STATES PATENTS

| | | |
|---|---|---|
| 2,232,180 | Kux | Feb. 18, 1941 |
| 2,608,826 | Haller | Sept. 2, 1952 |